(12) United States Patent
Hoggarth et al.

(10) Patent No.: US 6,535,976 B1
(45) Date of Patent: *Mar. 18, 2003

(54) INITIAL PROGRAM LOAD IN DATA PROCESSING NETWORK

(75) Inventors: Roger Philip Hoggarth, Ayrshire (GB); Richard Ian Knox, Bridge of Weir (GB); Andrew Liam Massey, Ayrshire (GB); Colin David McCall, Renfrewshire (GB); Sohail Syyed, Glasgow (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 857 days.

(21) Appl. No.: 08/828,014

(22) Filed: Mar. 27, 1997

(51) Int. Cl.[7] .......................... G06F 15/177; G06F 1/24
(52) U.S. Cl. ................. 713/2; 713/1; 713/100
(58) Field of Search .............................. 395/712, 651, 395/652, 187.01, 200.5, 200.54, 760, 500, 200.47, 200.52; 364/280, 280.2

(56) References Cited

U.S. PATENT DOCUMENTS

| | | | | |
|---|---|---|---|---|
| 5,257,378 A | * | 10/1993 | Sideserf et al. | 395/700 |
| 5,305,457 A | * | 4/1994 | Takida et al. | 395/700 |
| 5,349,664 A | * | 9/1994 | Ikeda et al. | 395/700 |
| 5,519,870 A | * | 5/1996 | Kannan et al. | 395/700 |
| 5,675,795 A | * | 10/1997 | Rawson, III et al. | 395/652 |
| 5,687,073 A | * | 11/1997 | Kishimoto | 364/131 |

* cited by examiner

Primary Examiner—Peter Wong
Assistant Examiner—Tim Vo
(74) Attorney, Agent, or Firm—Edward H. Duffield

(57) ABSTRACT

Methods of booting a client data processing system attached to a control data processing system in a data processing network. At power-on or re-boot of a client system, an initial program load request is issued from the client system onto the network and responsive to the receipt of the initial program load request at the control system, bootstrap code is transferred to the client to cause the client to boot from operating system code stored on a mass storage device of the client; alternatively, bootstrap code is transferred to the client system to cause the client to boot from operating system stored on a mass storage device of the client, or bootstrap code is transferred to cause the client system to boot from the control system.

14 Claims, 6 Drawing Sheets

INITIAL PROGRAM LOAD IN DATA PROCESSING NETWORK

TECHNICAL FIELD OF THE INVENTION

The present invention relates to a data processing network of the type in which a plurality of client computer systems are connected to a server computer system.

BACKGROUND OF THE INVENTION

In a typical network environment, multiple client computer systems (clients) are connected to one or more server computer systems (servers). In a first common arrangement, each client system includes an operating system and optionally other software, stored on a hard file within the client. On power-up or reboot the client boots from the operating system stored on the hard file without reference to the server computer. This type of boot is called a local program load. Other application software e.g. word processing, database software etc, held on storage associated with the server system, is accessed as needed by the client system.

In an alternative network configuration, the client computer does not boot from a locally stored operating system. One reason for this is that the client system does not have a local mass storage device such as a hard file on which the operating system software can be stored. Consequently, when such a client system is powered-up, the client fetches its operating system software from the server system and stores the software in volatile storage for use until the client system is powered-off. This process is called Remote Initial Program Load (hereinafter termed 'RPL').

A network of the second type in which each client system RPLs from a server system (an RPL network) has an advantage over the first type of network configuration in that the network administrator has full control over the software being used by the client. Thus the network administrator is able to control the operation and configuration of all the client systems with one consequence that the client users can be prevented from installing and using undesirable and/or unlicensed software on their client systems. By controlling the network from the server in this manner, the overall network maintenance costs are lower thus leading to lower overall operating costs.

However, an RPL network has a number of disadvantages, not the least of which is high network loading caused when a large number of clients RPL at one time. This overloading can cause disruption and reduced efficiency especially in large network environments. One way in which the effects of network overloading can be reduced is by providing a higher ratio of server to client systems. Typically this ratio will be 1:10 in an RPL network, whereas in the first type ("non-RPL") of network a typical ratio is more of the order of 1:100. As server systems are generally more expensive than client systems, this increase in ratio will raise the overall equipment costs of the network thus largely negating the lower maintenance costs.

It would be a desirable objective to provide for a network and a method of network operation which combines some or all of the advantages of both network configurations while avoiding most or all of the aforementioned disadvantages.

DISCLOSURE OF THE INVENTION

Accordingly, in a first aspect of the present invention, there is provided a method of booting a client data processing system attached to a control data processing system in a data processing network comprising: at power-on or re-boot of a client system, issuing an initial program load request from the client system onto the network; and responsive to the receipt of the initial program load request at the control system, transferring bootstrap code to the client to cause the client to boot from operating system code stored on a mass storage device of said client.

By this method, the client system is forced to issue an RPL request to the control system (server) which then controls the boot of the client system thereby preventing the client user from carrying out an unauthorised local boot operation.

In a preferred method, the client system BIOS specifies that the client may boot only from the control system, thereby forcing the client to issue the initial program load request onto the network. In a preferred method, this boot setting of the BIOS is protected by a control-system defined password.

Viewed from a second aspect of the invention, there is provided a method of booting a client data processing system attached to a control data processing system in a network comprising: at power-on or reboot of said client system, issuing an initial program load request from a client system onto the network; and responsive to the receipt of the request at the control system, either transferring, according to a first mode of operation, bootstrap code to the client system to cause the client to boot from operating system stored on a mass storage device of the client; or transferring, according to a second mode of operation, bootstrap code to cause the client system to boot from the control system.

In a preferred method according to the second aspect, the two modes of operation are defined in the control system and are selectable by the network administrator. Thus in the first mode—referred to in the detailed description as the normal mode—the client system is able to boot from the local hard file but only as permitted by the network administrator. If the administrator wishes to take control over the software on the client system e.g. for software installation or client system maintenance, the administrator changes the boot set-up for the client to force a boot according to the second (special) mode of operation.

In a preferred method, the second mode of operation comprises the further step of downloading control-system-specified software to the client system. On completion of the downloading of the control-system specified software to the client, the boot set-up for that client in said control system may be changed so that on next re-boot or power-on, the client will boot from the control-system defined software according to the first mode of operation.

The control-system specified software may be an upgrade to the existing operating system software stored on the mass storage device, whereby the method comprises the further step of replacing the existing software on said mass storage device with said upgraded software.

A client system in the form of a personal computer system will include BIOS code stored in non-volatile storage (e.g. ROM) in said client. In one preferred method, the control-system specified software is an upgrade to the BIOS code, the method comprising the further steps of storing the upgraded BIOS in said non-volatile storage.

In a preferred method according to the invention, the second (special) mode of operation is employed to install software onto a client system which has been newly connected to the network. In such a client system which initially has no operating software stored on said mass storage device, the control-system-specified software comprises operating system software for installation on said device, the method comprising the step of installing the operating system software on said mass storage device.

In a client system wherein BIOS code is stored in non-volatile storage and wherein the BIOS settings (including the location of the boot device) are protected by a BIOS password, the method of the present invention is advantageously employed to allow for the updating, under the control of the network administrator, of the BIOS password.

According to a third aspect of the invention there is provided a data processing network comprising a control data processing system connected to a plurality of client data processing systems, the control system including means responsive to an initial program load request received from a client system to transfer a bootstrap program to the requesting client to cause the client to boot from operating system software stored on a mass storage device of said client system.

A preferred embodiment of the present invention will now be described, by way of example only, with reference to the accompanying drawings.

DETAILED DESCRIPTION OF THE INVENTION

Figure 1:
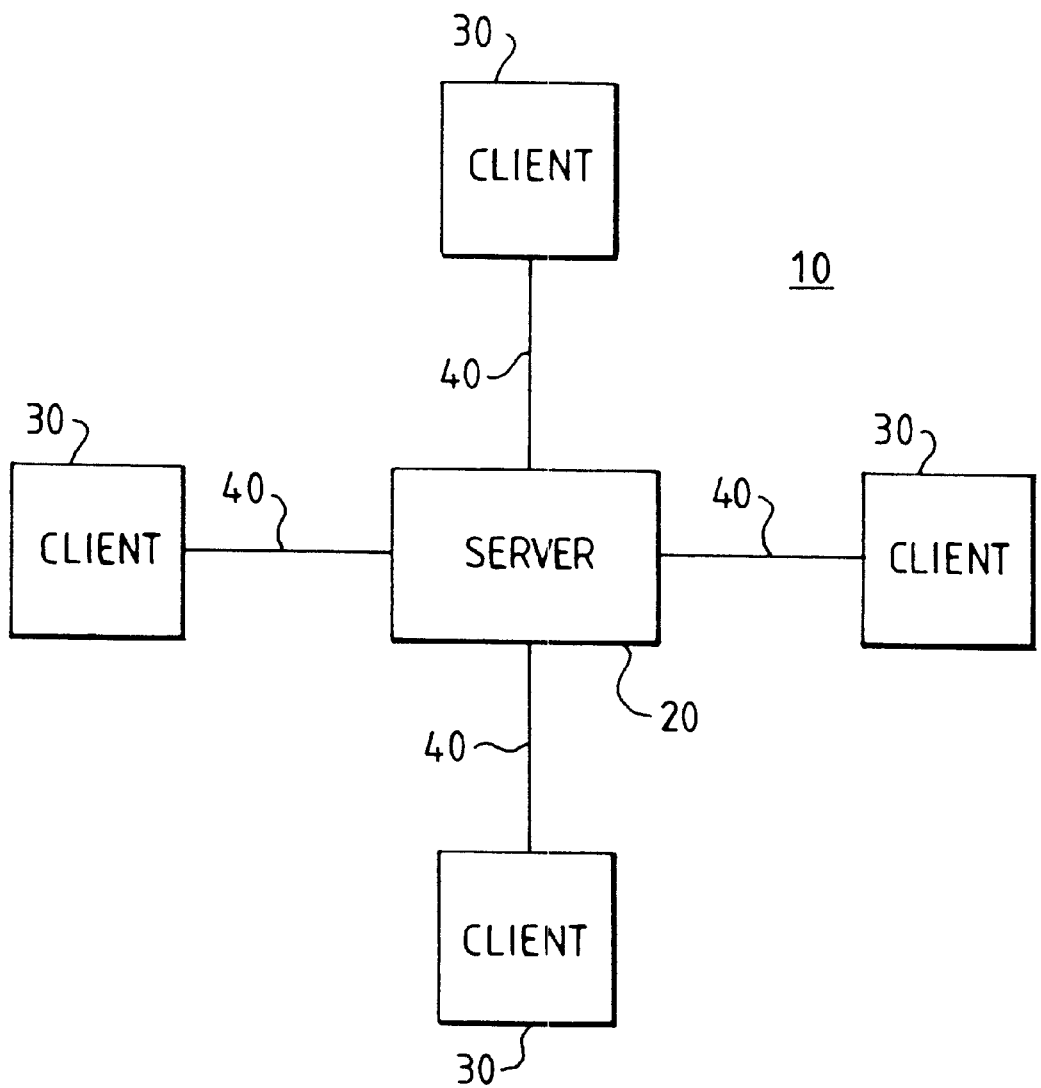
FIG. 1 is a schematic representation of a computer network according to a preferred embodiment of the present invention.

Referring firstly to FIG. 1, there is shown, in schematic form, a local area network (LAN) 10 according to a preferred embodiment of the invention. The network of FIG. 1, which may be constituted as an Ethernet or Token-ring LAN or other arrangement, is constituted of a server computer system 20 (which in the present embodiment may be an IBM PC 700 computer system) connected for communication by a link 40, in a loop configuration, with a plurality of client computer systems 30. The client computer systems may be personal computers based on the Intel X86 family of microprocessors or other forms of computer system. Typically such personal computers include a LAN adapter card to provide communication with the server computer. Control of resources on the network including communication between server and clients is effected by means of a network operating system (NOS) e.g. OS/2 LAN Server from IBM Corporation having a 'server' component which executes on the main processor(s) of the server computer system and a corresponding 'requester' component which executes on the main processor of each client computer system. Other suitable network operating systems include Netware from Novell Inc. and OS/2 WARP server from IBM.

Figure 2:
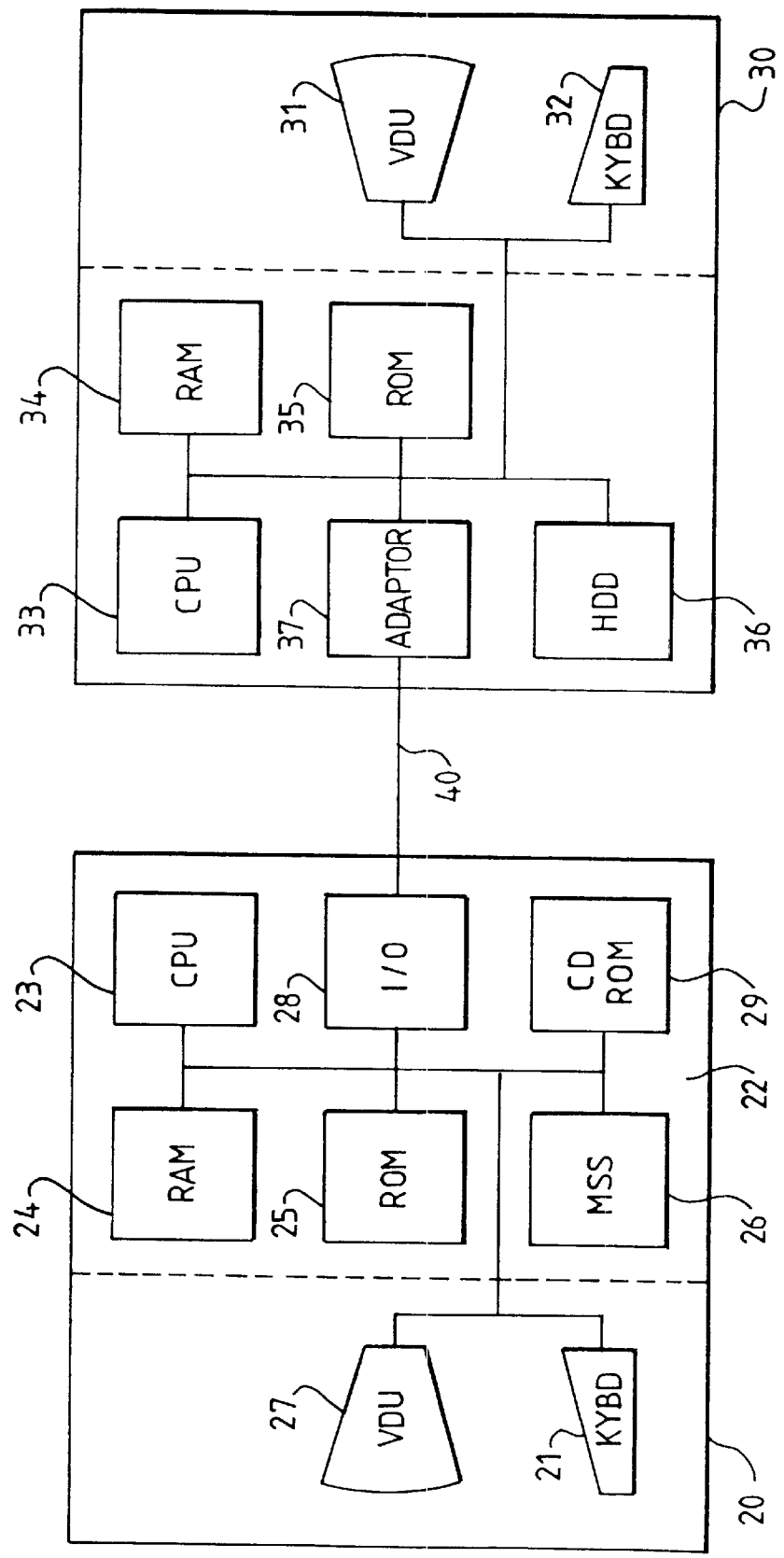
FIG. 2 is a block-diagrammatical representation of a client computer system connected to a server computer system in the network of FIG. 1.

FIG. 2 is a simplified block diagram in which a server computer system is shown connected to a client system over a communication link. As is normal, the client system, constituted in the present embodiment by a personal computer, includes a keyboard 31 and a display 32 operating under the control of control logic in the form of main CPU 33 which is connected by a system bus to system memory (RAM) 34 and non-volatile memory (ROM) 35, in which is stored system BIOS. The control logic is connected to one or more mass storage devices 36 e.g. in the form of a magnetic disk drive or hard file. If it is desired to prevent the client user from introducing software or data into the client system, the client system is advantageously not provided with a diskette drive, CD-ROM drive or similar. The client system further includes a network adapter card 37 which, in the present embodiment, may be either an ethernet or token-ring adapter card. This adapter card provides the communication between the client and server.

The server computer system includes a keyboard 21 attached to a system unit 22 including a main CPU 23, system RAM 24, system ROM 25 and mass storage capability 26, typically in the form of multiple magnetic disk drives constituted in a RAID (redundant array of independent disks) arrangement. Stored on the server mass storage devices are a variety of different types of software including operating system software, mirrors of which are stored on the hard file of each client system, and application software. The server system may optionally include a display 27 (if the network administrator requires direct interaction with the server system) and other storage devices such as a diskette drive (not shown) and CD-ROM drive 29. Communication over the link 40 is provided by input/output logic 28 which may take the form of an adapter card.

Although not indicated in FIGS. 1 or 2, the network may additionally comprise a further one or more server systems connected to a subset or all of the client computer systems. Furthermore, the client systems may not all be of the type described above. For example, the network may include so-called 'medialess' workstations i.e. systems which do not include a mass storage device and which are thus incapable of storing a local operating system. Such systems are configured to RPL from the server system at boot time in a conventional manner. The network may also advantageously include a 'console' system through which the network administrator controls the network. The console system will generally be similar to a client system except that the network administrator will be provided with certain privileges, not available to a client user, which allows him to control the network.

As discussed above in the background section, client systems in existing networks either boot from a server by means of a remote program load (RPL) operation, or alternatively execute a local program load from an operating system stored locally on the hard file. According to the present invention, and in a manner to be described below in more detail, there is provided a 'hybrid' initial program load mechanism which combines the advantages of both conventional RPL and local program load techniques while avoiding at least some of their disadvantages.

In essence the hybrid remote/local program Load (Hybrid RPL) technique operates in two modes: Normal and Special.

In the Normal case, at power-on or reboot of a client system on which is installed a local operating system, the client issues requests for RPL on the network. As will be described in greater detail below, according to the present invention, the client system BIOS is configured such the client may only boot from the server and not from a local hardfile or diskette. In response to the client RPL request, the server sends the client a bootstrap program which initiates a local program load which causes the client to operate, in effect, like a normal (i.e. non-RPL) client system.

In the Special case, when the network administrator wishes to take control of the workstation e.g. for maintenance purposes, the administrator firstly changes the setup of the server system to specify a different RPL bootstrap program for that client e.g. a minimal operating system with a remote maintenance utility. At the next power-on or re-boot, the client system issues a request for RPL as usual. The server then responds with the special bootstrap program as defined by the administrator. In response to the bootstrap program, the client then operates like a conventional RPL client, loading the software specified by the administrator. However, unlike most conventional RPL clients where the software is loaded for operation into the client's volatile memory, the software is instead installed onto the client hard file. The network administrator then changes the setup of the server to specify a local program load for the client. At the next power-on or reboot, the client then reverts to the normal operation as described above and carries out a local program load from the 'amended' software.

The present invention is preferably implemented as software code executing on the server computer, providing a user interface to the network administrator to allow him to configure and control the network in the manner to be described below.

It is an important feature of the present invention that each client is 'forced' to issue a boot request from the server at each power-on or reboot. That is, even where the client has a local operating system stored on its hard file, the client issues an RPL request to the server at each power-on or reboot. It is also an important requirement that each client system which is operable under the hybrid RPL technique of the present invention, includes some non-volatile storage device such as a hard file or similar, on which a portion of, or complete operating system may be stored to enable the normal mode hybrid RPL operation. By means of the present invention, the client is prevented from taking control and carrying out an unsupervised local boot. In the present embodiment, it is the system BIOS in the client which specifies the location from where the client boots at power-on or reboot. Thus the system BIOS is set to specify that the client may boot only from the network. This restriction is configured into the system BIOS at manufacture.

It will be appreciated that while setting of the system BIOS will generally ensure that the client can only boot from the network, it is possible that the client user could, if so-minded, gain access to, and reset the client system BIOS to specify a local boot. It is therefore desirable to employ a disabling mechanism, in the form of a BIOS password, by which the client user can be prevented from tampering with the system BIOS settings, including the location of the boot device. BIOS passwords are employed in some existing personal computers e.g. IBM PC 700 computer system to prevent unauthorized access to the BIOS setup routines. Thus the unauthorized user is prevented from resetting details of the device from which the client system boots. Although BIOS passwords per se are already known, one advantage of this aspect of the present invention is that the BIOS password is settable remotely by the network administrator. The BIOS password may be set by the network administrator when the client is first installed in the network. Alternatively, the password may be set in the factory at the time the client system is manufactured. One drawback with this latter technique is that some mechanism would then be required to convey the BIOS password to the server when the client is first installed in the network.

A different BIOS password may be set for all or a subset of clients. Alternatively, a single BIOS password may be employed for all clients. As will be described below, the BIOS password for selected clients may be reset at will by the network administrator by invocation of the 'special' mode of the Hybrid RPL mechanism.

Figure 3:
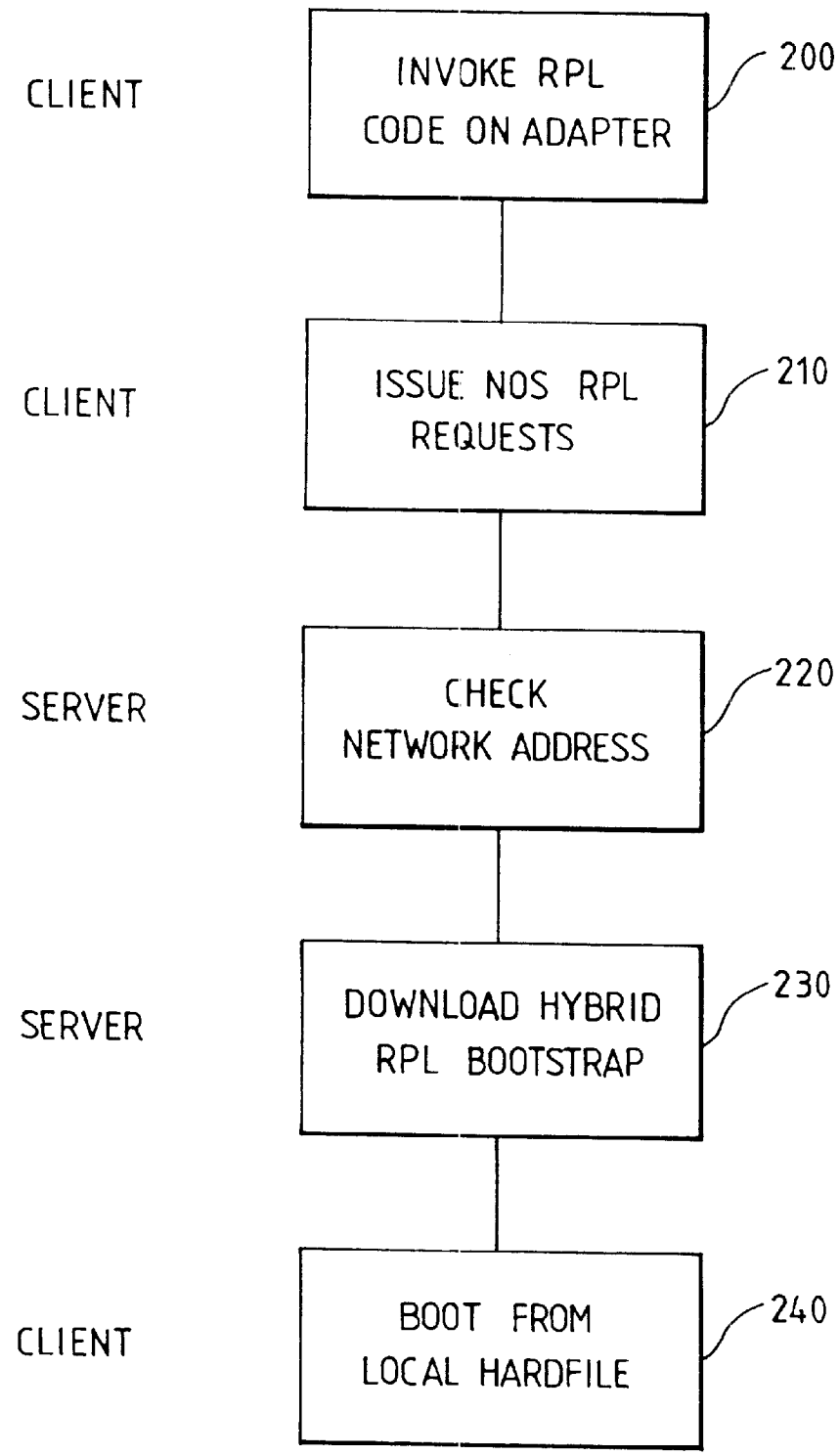
FIG. 3 is a flowchart showing the normal program load procedure according to one embodiment of the present invention.
Figure 4:
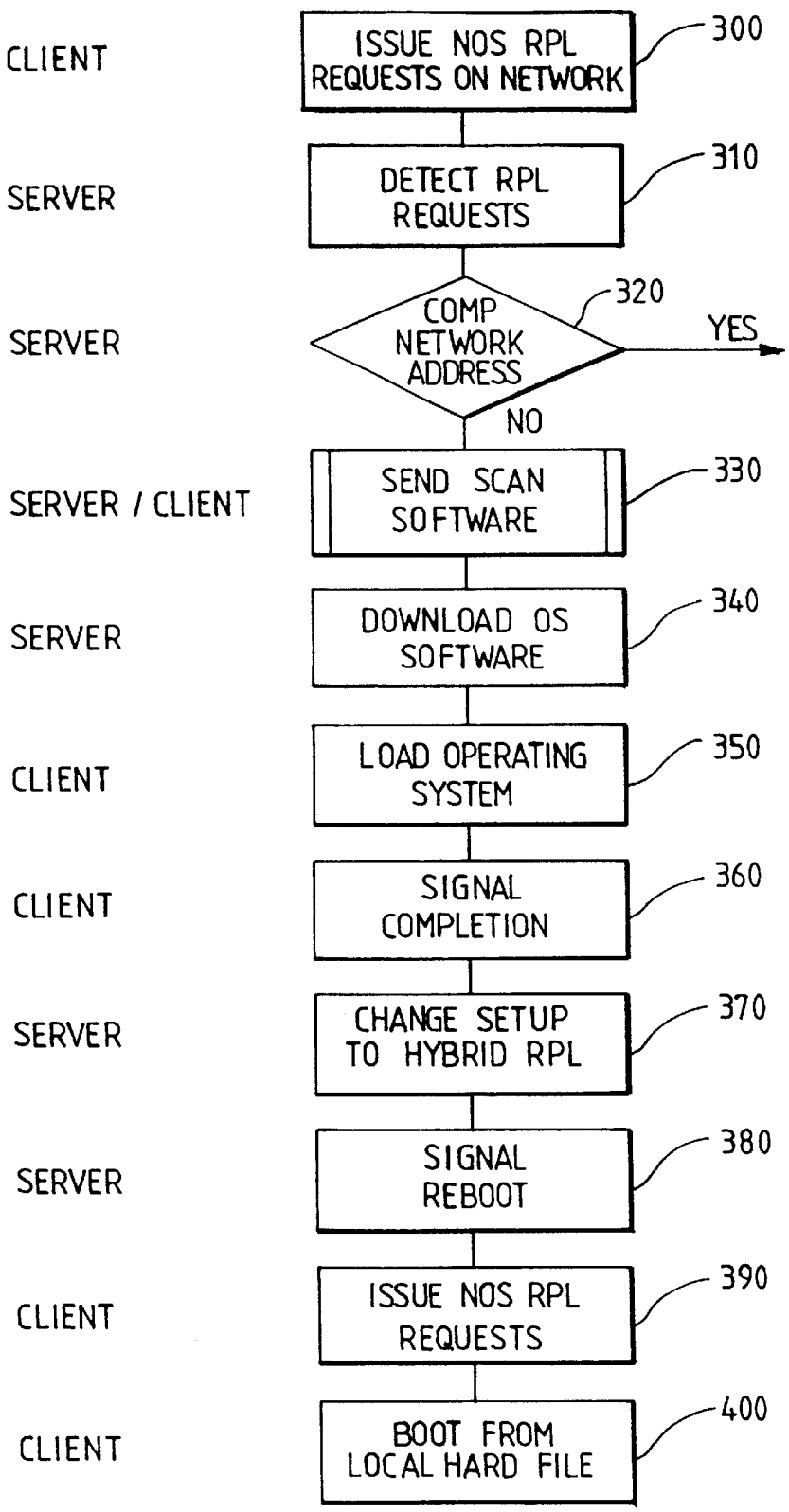
FIG. 4 is a flowchart showing the program load procedure during software installation.
Figure 5:
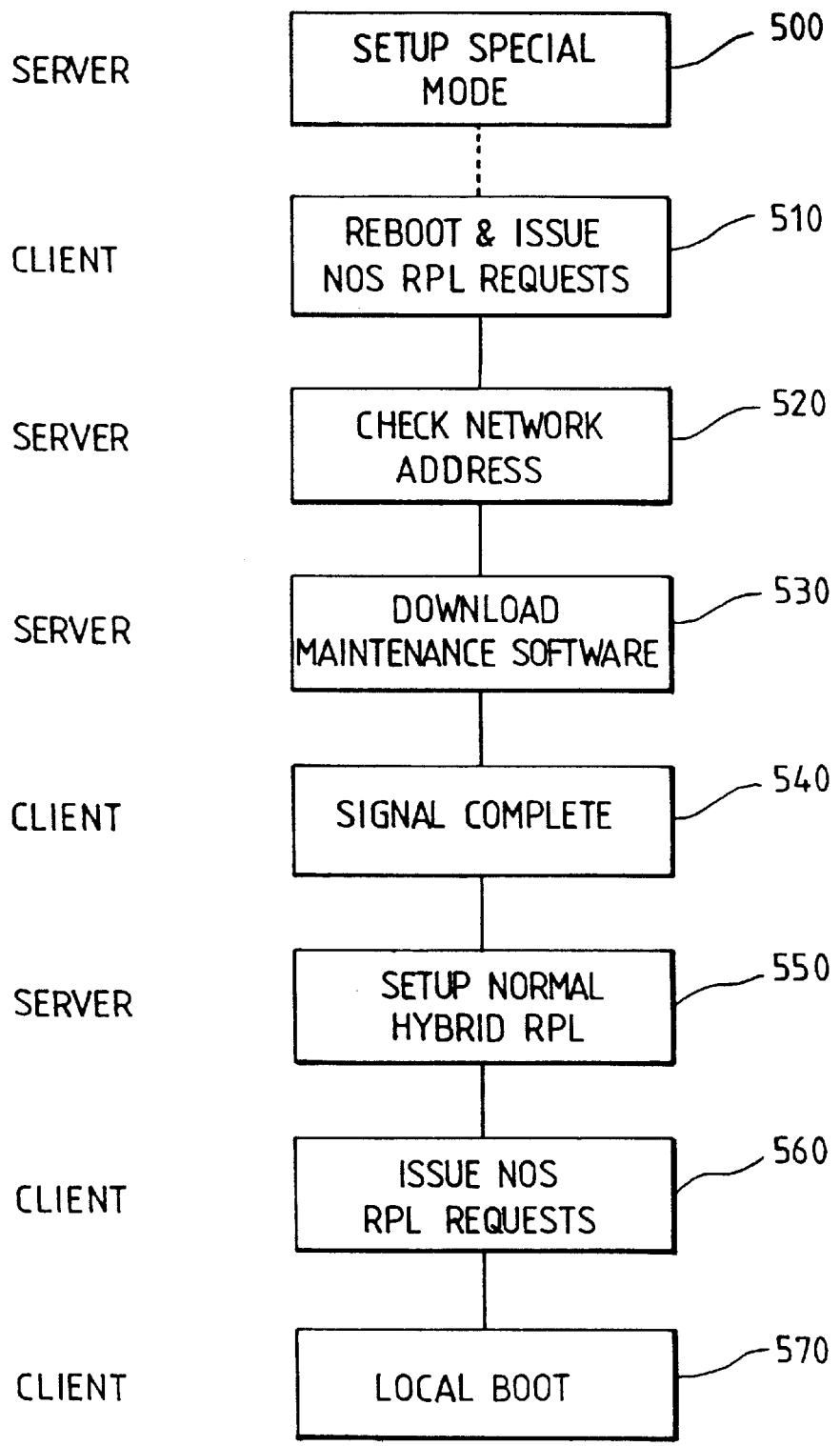
FIG. 5 is a flowchart showing the program load procedure during client maintenance.

Referring now to FIGS. 3, 4 and 5, the detailed operation of both normal and special modes will be described. As has been mentioned, the method steps are preferably implemented as a central process provided on the server computer which controls the operation of the client system.

FIG. 3 is a flowchart showing the sequence of steps involved in a normal case hybrid RPL operation. This sequence of steps is carried out when the client system is initially powered-up e.g. when the client user turns on the machine when wishing to start work, or alternatively at reboot. It is assumed that the client system already has a local operating system installed on its hardfile from which it can boot.

At step 200, after the client has completed various tests invoked at power-on, the system BIOS causes the client to invoke RPL code stored on the network adapter card. At step 210, this RPL code, executing on the main processor of the client, causes the client to issue NOS RPL requests over the link connecting the client to the server. A central process executing on the server, which listens for RPL requests from attached clients recognizes, at step 220, the client unique network address in the request and at step 230 sends hybrid bootstrap code to the client. As indicated at step 240, the hybrid bootstrap program causes the client to boot from its local hard file. The hybrid bootstrap loads the master boot record from the hard file to a fixed location in RAM, checks the content to ensure that it is a valid master boot record and passes program control to it.

Once the boot process is complete, the client user is then able to operate the client in a largely conventional manner. Thus, in principle, the client operates with no load on the network except for the transfer of the initial RPL requests and hybrid RPL bootstrap code.

In a preferred arrangement however, the client system is configured by the network administrator such that the local hard-file is read-only. That is, the client user is able to read files from the hardfile but may only access and store read/write files or data files on the server system. This feature is enabled, for example, by providing drivers for the hard file during software installation which restrict end-user access to the client hard file. In general, the drivers are advantageously designed to block all system calls which (i) create files; (ii) delete files; (iii) open files for writing; and (iv) change file attributes. For example for client systems loaded with DOS/Windows, access to the hard file is restricted by intercepting DOS software interrupts for file handle operations. This hard file access protection feature provides even greater control over the contents of a user's system at the cost of some increase in network loading. It will be appreciated however, that this loading will be much lower than in conventional RPL networks.

With reference to FIGS. 4 and 5, there is shown the sequence of steps involved in the special mode of hybrid RPL. As will be apparent, the special mode can be invoked by the network administrator to handle a variety of different types of situations. In a first situation, the special case is used to provide for the automatic installation of operating system and optionally other administrator-specified software when the client system is first connected to the network. Alternatively, the special case mode can be invoked to provide for re-installation or upgrade of the software already stored on the client hard file. In a further alternative, the special case mode can be invoked to reflash the system BIOS or reset the BIOS password. Other maintenance actions can be carried out in this manner.

Next is shown and described the sequence of steps involved in providing automatic installation of software onto the client system when the system is first connected to the network. One advantage of providing for automatic installation of software in this way is that it removes the need to carry out time-consuming and equipment-intensive preloading operations at the factory. A particular advantage of this aspect of the present invention is that the network administrator has complete control over the installation and no client-user intervention is required except for physically connecting the client to the network and flipping the power switch.

As is described in detail below, a scanning technique is employed such that on initial installation, the hardware configuration of the client is established by means of scan code issued by the server which executes on the client system, which in turn sends the results back to the server. The server then selects the appropriate software profile (either automatically or through the intervention of the network administrator) for the target client system based on its hardware capabilities (e.g. depending on amount of memory available, addressability of graphics adapter etc) and decisions made by the network administrator. In this way is enabled the automatic assignment of software to the client systems based on their hardware characteristics.

Before installation into the network, the client system hardfile will have no installed operating system. The system BIOS (which specifies that the client can boot only from the network) is already installed in the system. The network adapter card is connected via cabling attached to its external connector to the server.

With reference now to FIG. 4, at step 300, the client is powered-on which causes the network card to issue NOS RPL requests over the network. The NOS RPL requests specify the network address which was burned-in to the client at the factory. At step 310, a central process executing on the server system detects the RPL requests issued by the client. At step 320, the server process compares the network address of the client against a locally-stored list of known clients. As the client is new to the network, the new client address will not be in the list and the server therefore marks the target client as requiring scanning. Details of the scan process are shown and described below with reference to FIG. 6, but briefly the server process sends the scan client software to the client at step 330 which determines the hardware configuration, details of which are then sent to the server. Based on this information, the server assigns a software profile to the client and at step 340 downloads, to the client, an install program and operating system and optionally other software according to the client profile stored in the server. At step 350, the client receives the code from the server and runs the install program to load the operating system software onto the client hardfile. At step 360, the client indicates completion of the installation process by sending a complete signal to the server. The server responds, as indicated at step 370, by changing the setup for the client to normal mode of hybrid RPL.

At step 380, the server issues a signal to the client causing the client to reboot. The client reboots, at step 390, and issues NOS RPL requests to the server. In response, the server transmits the hybrid bootstrap code (as described above in relation to step 230 of FIG. 3) to the client which in turn causes, at step 400, the client to boot from the newly-installed operating system software from its hard file. The client may then continue operation.

As is described in more detail in copending application (applicant's reference number UK9-96-020), the server system is provided with software which allows the network administrator to create profiles for each connected client via a graphical user interface. These profiles include the software images that are to be installed onto the client systems and optionally further information tailored to a specific client. For example, a network may be comprised of multiple clients having identical hardware configurations. In this case, it may be suitable for the administrator to define, via the server software, a common software image for each client. However, it will more commonly happen that the network will be comprised of client systems having differing hardware configurations, in which case it is advantageous to tailor the software images as appropriate. This tailoring is also referred to as personalisation.

The aim of the installation process is to fully install as wide a range of software as possible onto the hard files of the clients. In a preferred arrangement, the installation stage indicated at step 340 of FIG. 4 comprises three main elements.

a) Depending on the particular software profile, selected clients may need preparation to receive the final software image. Some operating system software (e.g. Windows 95) does not load onto standard FAT partitions on the hardfile. In this case, pre-processing is required to prepare suitable disk partitions. A pre-load image is provided to the client which specifies an initial set of software to be executed on the client before the final software image is loaded.

b) The final image is copied onto the client's hardfile. The image file is advantageously a self-extracting .exe file that contains all the files required by the client. This is copied down to each client and is then expanded onto the clients' local hard file. By this means, each client has stored thereon an identical software image on their hard files.

It is however generally necessary to personalise each client for a variety of reasons. For instance, most networking systems require a unique TAG for each client on the network e.g. TCP/IP addresses may need to be set to allow a protocol stack to operate; terminal emulation programs may require different id's for each client. This personalisation is achieved by the provision of personality files associated with each client. These are run as the last step in the installation (or reinstallation) process.

c) The client personality files defined by the network administrator are downloaded and run on each client. These files are simple batch files that allow .INI, text and registration database files to be edited for each client.

Next will be described, with reference to FIG. 5, the sequence of steps involved in the special hybrid RPL mode during maintenance operations. As will be appreciated, a large number of these steps are the same as steps described above in relation to FIG. 4. As has been described, the special mode is invoked by the network administrator when it is desired to take control over the client for re-installation or other maintenance purposes.

At step 500, the network administrator changes the setup of the server to specify a new hybrid RPL profile for a client. In other words, the 'normal' mode of operation is disabled.

At step 510, when the client system is next powered-on or rebooted (either using a remote control utility specified by the administrator or alternatively by the client user), the client issues one ore more NOS RPL requests via the network adapter. At step 520, the server recognizes the client unique network address in the request. However, in this mode, the server does not issue the hybrid bootstrap code to cause the client to execute a local boot. Instead, the server downloads selected software according to a software profile defined according to the required maintenance function. In the following description, this downloaded software is termed maintenance software though as will be described below it may in fact be software for upgrading the local operating system, software for upgrading system BIOS or other software. At step 530 therefore, the maintenance software is downloaded to the client system where it is executed and/or stored onto the local hardfile. At step 540, the client indicates to the server that the operation on the client is complete. In response, the server process changes the setup for the client back to hybrid RPL bootstrap at s step 550. At next reboot, indicated at step 560, which may be initiated either by the remote control utility or by the client user, the client issues the normal RPL request via the client network adapter card and local boot takes place as per normal hybrid RPL—step 570.

In one example, the maintenance program comprises an operating system upgrade; which may be either a complete operating system or additional upgrade code to add to the existing software. Thus, the server downloads a revised operating system and install program which replaces the operating system currently stored on the hardfile. Alternatively, the maintenance software can be an upgraded version of the client system BIOS which is re-written over the original BIOS. The upgraded BIOS is written directly over the existing BIOS in flash ROM, while preserving any client-specific information such as serial number and model number. The server advantageously invokes an immediate reboot of the client after the upgraded BIOS is loaded in order to make use of the new level of system BIOS.

In a further arrangement, the maintenance software comprises code for resetting the password associated with the system BIOS. The password is stored in non-volatile storage on the client in the form of an encoded check sum and an indication that the password function is enabled. The password is changed by writing a different checksum to the non-volatile RAM, or disabled by writing an indication that the password function is disabled.

Figure 6:
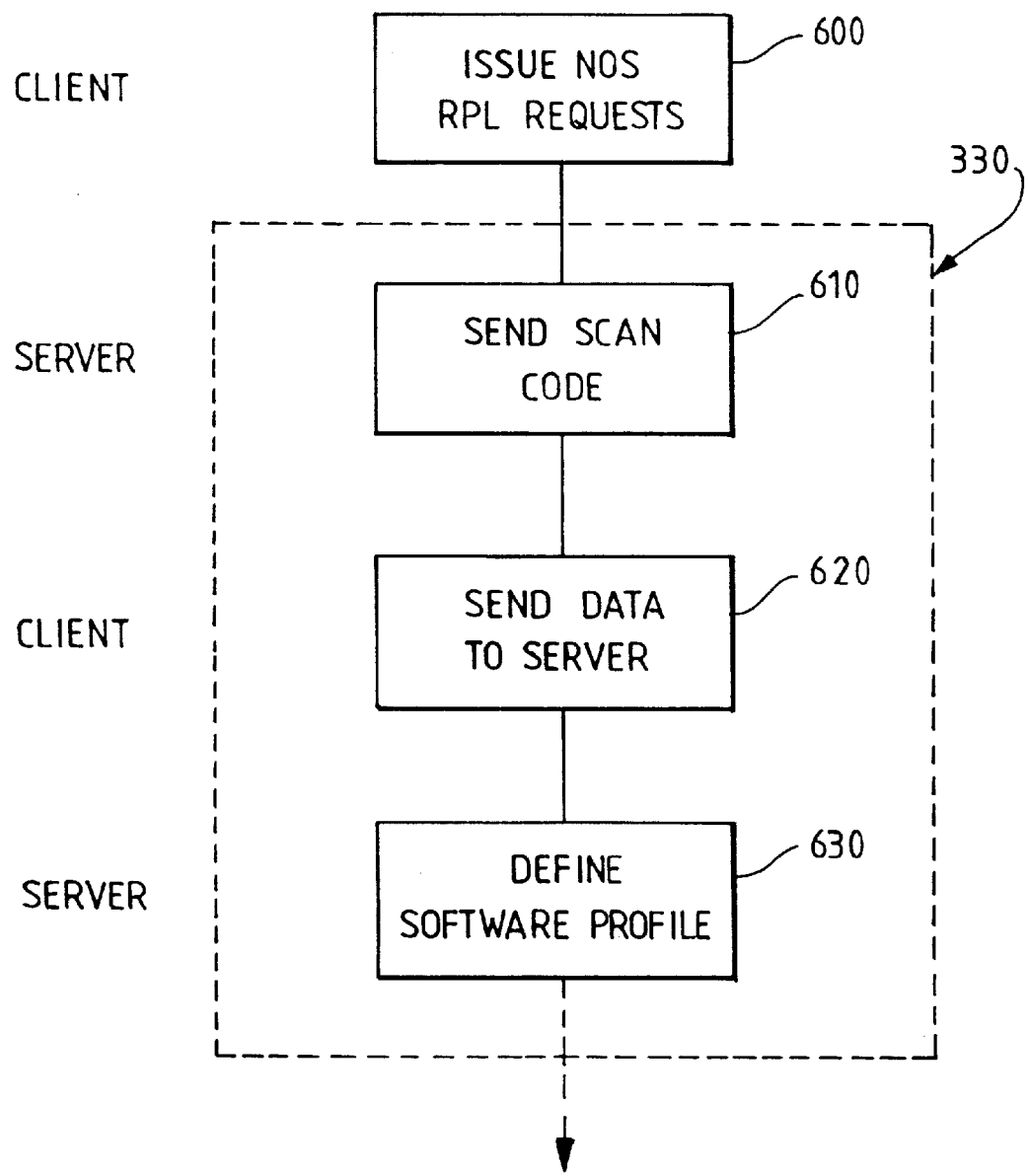
FIG. 6 is a flowchart showing details of the scan process for determining the hardware configuration of a client system prior to software installation.

Details of the initial scan process will now be described. As has been described above, this network scan technique for clients gathers details of any new clients which are attached to the network. The scan process is loaded to each client as it initiates RPL. With reference to FIG. 6, when the client is first attached to the network, it issues one or more NOS RPL requests onto the network, at step 600, which identify the network address of the client. As the client is new to the network, the network address specified in the request does not exist on the client address list held in the server and accordingly, the central server process marks the received address as requiring an RPL of the scan client software. Therefore at step 610, the server responds by sending the scan client software to the client which then executes on the client to gather information about the client hardware configuration. The scan code executes on the client system processor and gathers information by one or more of:

(i) BIOS function calls which return the information;
(ii) Reading system identification information directly from the hardware on the client system board, including the system processor itself;
(iii) Reading information contained in the BIOS ROM;
(iv) Reading information written by the BIOS ROM into the non-volatile storage on the system;
(v) Where the client system bus allows it, reading identification information from adapter cards in the client system bus. (Microchannel and PCI busses, among others, enable this function;
(vi) Optionally, by prompting the user of the client system to type in additional information, for example the location of the system or the telephone number of the user.

For example, the information gathered includes (i) network adapter type, (ii) network address, (iii) hard disk presence and storage capacity, (iv) RAM installed, (v) graphics adapter type. Optionally, the information gathered further includes (i) client serial number, (ii) client machine type and model, (iii) whether there is a mouse attached, (iv) whether there is a keyboard attached, (v) any additional user defined data.

Although the scan process is designed to avoid client user intervention, the network administrator may also define additional information to be collected at install time, such as the location or contact name. This is done by specifying a prompt file which causes prompts to be displayed at the client during the scan process. Responses types by the client user are recorded.

At step 620, the client sends the gathered configuration data to the server, where the information is assimilated and a software profile appropriate to the target client is defined at step 630. The software installation process continues as already described at step 340 of FIG. 4.

It will be appreciated that a number of advantages over existing techniques are provided by the hybrid RPL technique described above. In particular:

The network administrator retains full control over each client's software. At any time the RPL setting can be changed to special mode for any client so that the next time the client boots, new software can be downloaded onto that client.

The network administrator retains full control over client operations. If the client is removed from the network and an attempt is made to reboot, the RPL will fail as there is no network to respond to the client systems RPL requests. The BIOS boot setting is protected by password and therefore it is not possible for the client user to boot from the local hardfile.

What is claimed is:

1. A method of booting a client data processing system attached to a control data processing system in a data processing network comprising:

at power-on or re-boot of a client system, issuing an initial program load request from the client system onto the network; and responsive to the receipt of the initial program load request at a control system, transferring bootstrap code to the client system to cause the client system to load operating system code from a mass storage device of the client system, the operating system code being present on the mass storage device at the time when the initial program load request was issued from the client system onto the network.

2. A method as claimed in claim 1, wherein the client system includes BIOS that specifies that the client system may boot only from the control system, thereby forcing the client system to issue an initial program load request onto the network.

3. A method as claimed in claim 2, wherein the boot setting of the BIOS is protected by a password settable by the control system, but not by the client system.

4. A method of booting a client data processing system attached to a control data processing system in a network comprising:

at power-on or reboot of a client system, issuing an initial program load request from the client system onto the network;

responsive to the receipt of the request at a control system, transferring, according to a first alternative mode of operation, bootstrap code to the client system to cause the client system to boot from operating system code stored on a mass storage device of the client system, the operating system code being present on the mass storage device at the time of issuance of the initial program load request onto the network; or transferring, according to a second alternative mode of operation, bootstrap code to cause the client system to boot from the control system.

5. A method as claimed in claim 4, wherein the first and second modes of operation are selectable by the user of the control system.

6. A method as claimed in claim 4 or claim 5, wherein the second mode of operation comprises the further step of downloading software specified by the control system client system.

7. A method as claimed in claim 6, wherein on completion of the downloading of the specified software to the client system, the method comprises the further step of altering the mode set-up for that client in the control system so that on next re-boot or power-on, the client system is caused to boot from the downloaded software according to the first mode of operation.

8. A method as claimed in claim 6, wherein the client system has no operating software stored on the mass storage device and the specified software comprises operating system software for installation on the mass storage device, the method comprising the further step of installing the operating system software on the mass storage device.

9. A method as claimed in claim 7, wherein the control-system specified software is an upgrade to the existing operating system software stored on the mass storage device, of the client system and the method comprises the further step of replacing the existing software on the mass storage device with the software upgrade.

10. A method as claimed in claim 7, wherein the client system includes BIOS code stored in non-volatile storage in the client system and the specified software is an upgrade to the BIOS code, the method comprising the further step of storing the upgraded BIOS in the non-volatile storage.

11. A method as claimed in claim 7, wherein the client system includes the BIOS code stored in non-volatile storage in the client system, the settings of the BIOS being protected by a BIOS password, and wherein the software specified by the control system comprises code for changing the BIOS password.

12. A data processing network comprising a control data processing system connected to a plurality of client data processing systems; a client system including a mass storage device and means for issuing an initial program load request onto the data processing network; a control system including means responsive to an initial program load request received from a client system to transfer a bootstrap program to the requesting client to cause the client system to boot from operating system software which was stored on the mass storage device prior to issuance of the initial program load request by the client system onto the data processing network.

13. A data processing network comprising a control data processing system connected to a plurality of client data processing systems; each client system including means for issuing an initial program load request onto the data processing network; and the control data processing system including means having first and second modes of operation which is responsive, in the first mode of operation, to an initial program load request received from a client system to transfer a bootstrap program to the requesting client system to cause the client system to boot from operating system software which was stored on a mass storage device of the client system prior to issuance of the initial program load request by the client system; and responsive, in the second mode of operation, to an initial program load request received from a client system to transfer a bootstrap program to the requesting client system to cause the client system to boot from the control data processing system.

14. A data processing system for controlling client data processing systems in a network including means having first and second modes of operation responsive, in the first mode of operation, to an initial program load request received from a client system to transfer a bootstrap program to the requesting client system to cause the client system to boot from operating system software which was stored on a mass storage device of the client system prior to issuance of the initial program load request by the client system; and in the second mode of operation, to an initial program load request received from a client system to transfer a bootstrap program to the requesting client system to cause the client system to boot from the control data processing system.

* * * * *